No. 717,329. Patented Dec. 30, 1902.
F. BOELK.
TIRE INSERTER AND REMOVER.
(Application filed Mar. 20, 1902.)
(No Model.)
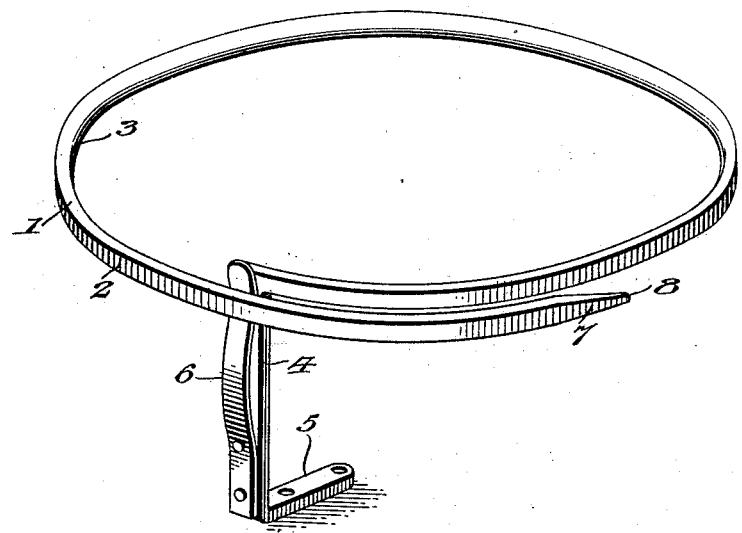
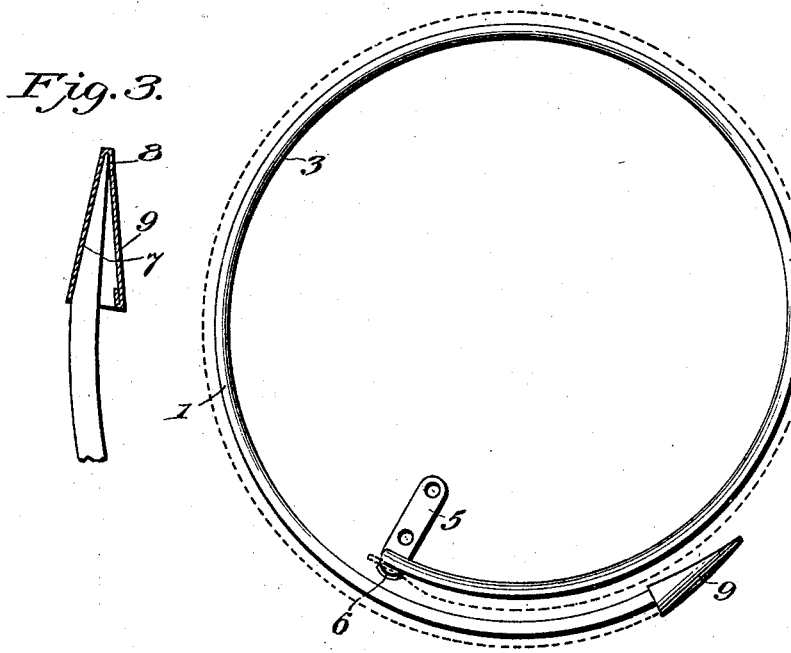
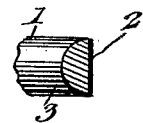
Witnesses
Edwin L. McKee
Chas. S. Hoyer
Inventor
Frank Boelk
By Victor J. Evans
Attorney
THE NORRIS PETERS CO., PHOTO-LITHO., WASHINGTON, D. C.

UNITED STATES PATENT OFFICE.

FRANK BOELK, OF WALTHAM, MINNESOTA.

TIRE INSERTER AND REMOVER.

SPECIFICATION forming part of Letters Patent No. 717,329, dated December 30, 1902.

Application filed March 20, 1902. Serial No. 99,185. (No model.)

*To all whom it may concern:*

Be it known that I, FRANK BOELK, a citizen of the United States, residing at Waltham, in the county of Mower and State of Minnesota, have invented new and useful Improvements in Tire Inserters and Removers, of which the following is a specification.

This invention relates to a tube inserter and remover for pneumatic tires, and contemplates the provision of a simple device which is held in stationary position and adapted to have an inner tube removably connected thereto at opposite extremities and drawn over the device, whereby the tube may be easily and conveniently inserted into the tire in its proper position in respect to the latter and avoid twisting or disarrangement of the tube within the tire and also adapted for use for readily removing or discharging the tube from the tire by a reverse operation.

The invention consists in the arrangement and construction of the several parts, which will be more fully hereinafter described and claimed.

In the drawings, Figure 1 is a perspective view of a device embodying the features of the invention. Fig. 2 is a top plan view of the same, showing a tube applied thereto in dotted lines. Fig. 3 is a sectional view taken through the outer extremity of the improved device. Fig. 4 is a transverse vertical section showing the contour of the device.

Similar numerals of reference are employed to indicate corresponding parts in the several views.

The numeral 1 designates the main body of the improved device, which is in the form of a spiral bar of a resilient nature, having an outer flat face 2 and an inner convex face 3. The inner terminal of the bar is held securely by an upstanding leg 4, provided with a lower angular foot 5, adapted to be fastened to a bench or other support, and to the lower extremity of the leg is secured a clamping-spring 6, having its free end extending upwardly over the outer side of the inner terminal of the bar 5. The outer extremity of the bar 1 overlaps and is spaced from the inner extremity of said bar, which is connected to the leg 4, the terminal 7 of the outer extremity of the bar being tapered to a blunt point 8. Removably fitted over the terminal 7 is a conical securing-cap 9, which is considerably larger than the said terminal to compensate for the material of the tube, which is applied over said terminal.

In the use of the device the one end of the tube is drawn over the terminal 7 and around the body of the improved device and immovably held by the clamping-spring 6, which is opened and then permitted to bear against the tube at the end of the body adjacent to the leg 4. The opposite end of the tube, which will then engage the terminal 7, has the cap 9 fitted thereover, and when the tube is thus secured the tire is drawn over the tube and body, and the said tube thereby regularly and accurately disposed within the tire. After the tube has been fully inserted in the tire the cap 9 is detached, and the tire and tube are then gradually drawn off from the body, the clamp being also pressed outwardly to release the terminal of the tube engaged thereby. In removing the tube from a tire the tire containing the tube to be removed is drawn over the body, and the one end of the tube is caught by the clamping-spring 6. The tire is then pulled in the direction of the outer extremity of the body, thereby leaving the tube on the latter. These several operations, through the medium of the improved device, can be expeditiously carried on and will reduce the labor and inconvenience frequently encountered in applying and removing tubes.

Having thus fully described the invention, what is claimed as new is—

1. A device of the class set forth comprising a horizontally-disposed spirally-arranged bar having the extremities overlapped and spaced apart from each other, the one extremity continuing into a vertical leg provided with a lower angular foot.

2. A device of the class set forth having a rigidly-supported horizontally-disposed spiral bar with overlapped extremities spaced apart from each other, a vertically-arranged clamping-spring having its free end loosely coöperating with the inner extremity of the bar, and a cap removably fitted over the outer extremity of said bar.

In testimony whereof I affix my signature in presence of two witnesses.

FRANK BOELK.

Witnesses:
JOHN H. NEMITZ,
H. J. DROST.